(12) United States Patent
Cresens

(10) Patent No.: US 12,118,701 B2
(45) Date of Patent: Oct. 15, 2024

(54) METHOD AND SYSTEM TO CHARACTERIZE AND MONITOR THE SHARPNESS OF A DIGITAL IMAGING SYSTEM

(71) Applicant: AGFA NV, Mortsel (BE)

(72) Inventor: Marc Cresens, Mortsel (BE)

(73) Assignee: Agfa NV, Mortsel (BE)

( * ) Notice: Subject to any disclaimer, the term of this patent is extended or adjusted under 35 U.S.C. 154(b) by 704 days.

(21) Appl. No.: 17/421,981

(22) PCT Filed: Jan. 8, 2020

(86) PCT No.: PCT/EP2020/050257
§ 371 (c)(1),
(2) Date: Jul. 9, 2021

(87) PCT Pub. No.: WO2020/144202
PCT Pub. Date: Jul. 16, 2020

(65) Prior Publication Data
US 2022/0114716 A1    Apr. 14, 2022

(30) Foreign Application Priority Data

Jan. 9, 2019 (EP) .................................... 19150965
May 14, 2019 (EP) .................................... 19174441

(51) Int. Cl.
*G06T 7/00* (2017.01)
*G01N 23/04* (2018.01)
(Continued)

(52) U.S. Cl.
CPC ........... *G06T 7/0002* (2013.01); *G01N 23/04* (2013.01); *G01N 23/083* (2013.01); *G06T 5/73* (2024.01);
(Continued)

(58) Field of Classification Search
CPC .... G06T 7/80; G06T 7/97; G06T 5/73; G01N 23/04
See application file for complete search history.

(56) References Cited

U.S. PATENT DOCUMENTS 6,476,394 B1 * 11/2002 Amitani ................ G01T 1/2002
250/370.11
6,535,636 B1 * 3/2003 Savakis ................ G06V 10/993
382/173

(Continued)

FOREIGN PATENT DOCUMENTS

EP    3680851 A1    7/2020

OTHER PUBLICATIONS

Baran et al., "Optimization of propagation-based x-ray phase-contrast tomography for breast cancer imaging," *Phys. Med. Biol.*, 62(6): 2315-2332 (Mar. 2017).

(Continued)

*Primary Examiner* — Wen W Huang
(74) *Attorney, Agent, or Firm* — Leydig, Voit & Mayer, Ltd.

(57) ABSTRACT

The invention is related to a method for automatic selection and pre-processing of digital images that comprise the necessary amount of Transfer function modulated quantum-noise to apply a mathematical sharpness calculation method for calculation of a sharpness parameter of the digital imaging system. Suitable images for the method are selected from the pool of available images acquired by the digital imaging system during daily operation.

18 Claims, 6 Drawing Sheets

(51) Int. Cl.
*G01N 23/083* (2018.01)
*G06T 5/73* (2024.01)
(52) U.S. Cl.
CPC ............ *G06T 7/97* (2017.01); *G01N 2223/04* (2013.01); *G01N 2223/40* (2013.01); *G06T 2207/10116* (2013.01); *G06T 2207/20032* (2013.01); *G06T 2207/30168* (2013.01)

(56) References Cited

U.S. PATENT DOCUMENTS

| | | | | |
|---|---|---|---|---|
| 2007/0053557 | A1* | 3/2007 | Cahill | G06T 7/0012 382/128 |
| 2007/0286336 | A1* | 12/2007 | Bernard | G06T 7/0012 378/62 |
| 2016/0255341 | A1* | 9/2016 | Mateti | G06T 5/80 348/187 |
| 2018/0220054 | A1* | 8/2018 | Swami | H04N 25/58 |
| 2018/0350106 | A1* | 12/2018 | Kasilya Sudarsan | H04N 23/633 |
| 2019/0287241 | A1* | 9/2019 | Hill | A61B 6/5282 |

OTHER PUBLICATIONS

Cunningham, "Use of the Detective Quantum Efficiency in a Quality Assurance Program," *Proc. SPIE, Medical Imaging 2008: Physics of Medical Imaging*, vol. 6913, 691331, 5 pp. (Mar. 2008).
Du et al., "Quantitative comparison of image contrast and pattern between experimental and simulated high-resolution transmission electron micrographs," *Ultramicroscopy*, 107(4-5): 281-292 (Apr.-May 2007).
European Patent Office, International Search Report in International Patent Application No. PCT/EP2020/050257, 5 pp. (Feb. 21, 2020).
European Patent Office, Written Opinion in International Patent Application No. PCT/EP2020/050257, 11 pp. (Feb. 21, 2020).
Kuhls-Gilcrist et al., "A method for the determination of the two-dimensional MTF of digital radiography systems using only the noise response," *Proc. SPIE, Medical Imaging 2010: Physics of Medical Imaging*, vol. 7622(76224W): 76224W-1 -76224W-9 (Mar. 2010).
Kuhls-Gilcrist et al., "Accurate MTF measurement in digital radiography using noise response," *Med. Phys.*, 37(2): 724-735 (Feb. 2010).
Pang et al., "Investigation of a direct conversion flat panel imager for portal imaging," *Med. Phys.*, 28(10): 2121-2128 (Oct. 2001).

* cited by examiner

METHOD AND SYSTEM TO CHARACTERIZE AND MONITOR THE SHARPNESS OF A DIGITAL IMAGING SYSTEM

CROSS-REFERENCE TO RELATED APPLICATIONS

This patent application is a U.S. National Phase application of International Patent Application No. PCT/EP2020/050257, filed Jan. 8, 2020, which claims the benefit of European Patent Application No. 19150965.2, filed Jan. 9, 2019 and European Patent Application No. 19174441.6, filed May 14, 2019.

TECHNICAL FIELD

The present invention relates generally to a system and a method to automatically calculate the sharpness of a digital imaging system and to monitor this sharpness over time. The invention may be applied in the field of medical X-ray imaging, but also in any other imaging field such as photography, and may be applied to technical fields where digital imaging detectors or digital imaging systems are applied. The method of the invention relies on a method to calculate the point spread function (PSF) of a digital image detector based on a measurement comprising Transfer function modulated quantum-noise without requiring a dedicated image acquisition of a specifically designed test object or image phantom.

The method provides for the automatic selection and pre-processing of suitable images comprising the necessary amount of Transfer function modulated quantum-noise to apply said calculation method. Suitable images for the method are selected from the pool of available images acquired by the digital imaging system during daily operation.

BACKGROUND OF THE INVENTION

Digital image acquisition systems are often equipped with an array-detector, composed of a set of plane-wise arranged light-sensitive pixels, and read-out electronic circuitry to compose a digital image. Examples of these systems are the different types of static and dynamic cameras used in a vast range of applications from photography up to flat-panel detector direct radiography imaging. Image acquisition systems which incorporate a line-sensor to time-sequentially record an image are often equipped with a motion control system to scan-wise capture the digital image as a set of adjacently recorded image-lines. Other image acquisition systems as used in computed radiography applications capture their digital images by means of an intermediate, analog image storage process step followed by line-wise or flying spot-wise stimulated reemission and sampled, digital capture by a single photomultiplier or a line-sensor.

Digital X-ray imaging devices are increasingly used in medical diagnosis and are widely replacing conventional (analogue) imaging devices such as screen-film systems or analogue X-ray image intensifier television systems. It is necessary, therefore, to define parameters that describe the specific imaging properties of these digital X-ray imaging devices and to standardize the measurement procedures employed.

The point spread function (PSF) describes the response of an imaging system to a point source or point object. A more general term for the PSF is a system's impulse response, the PSF being the impulse response of a focused optical system. The PSF is the spatial domain version of the optical transfer function of the imaging system. It is a useful concept in Fourier optics, astronomical imaging, medical imaging, electron microscopy and other imaging techniques such as 3D microscopy (like in confocal laser scanning microscopy) and fluorescence microscopy. The degree of spreading (blurring) of the point object is a measure for the quality of an imaging system. The image of a complex object can then be seen as a convolution of the true object and the PSF. However, when the detected light is coherent, image formation is linear in the complex field. Recording the intensity image then can lead to cancellations or other non-linear effects.

Spatial resolution is the ability of the imaging system to resolve fine details present in an object. It also refers to the sharpness of the image. For digital imaging systems, the spatial resolution depends on the size of the pixels in the matrix. Smaller pixels will produce images with better spatial resolution compared with larger pixels. In the art, measuring the spatial resolution is a complicated process that involves at least three methods. These include imaging a bar test pattern, a sharp-edged object, or a narrow slit. While the image of the bar test pattern is easy to interpret visually for the sharpness of the lines, the latter two are more complicated. For the edged object and the narrow slit, an edge-spread function (ESF) and a line-spread function (LSF) have to be obtained, respectively. The narrower the LSF, the better the spatial resolution. The LSF can be understood as the convolution of the point spread function (PSF) over the narrow slit (or line). The three methods listed above can be used to produce yet another function called the modulation transfer function (MTF).

The MTF (Modulation Transfer Function) measurement is an important tool for the objective assessment of the imaging performance of imaging systems. Moreover, the MTF can even be calculated from the lens design data giving designers of optical systems the ability to predict system performance reliably. The manufacturer can then compare the image quality of real lenses with the expectations from the design phase. The MTF, describing the resolution and performance of an imaging system, is the ratio of relative image contrast divided by relative object contrast.

$$MTF = \frac{\text{Relative Image Contrast}}{\text{Relative Object Contrast}}$$

When an object (such as an exposed target) is observed with an imaging system, the resulting image will be somewhat degraded due to inevitable aberrations and diffraction phenomena. In optical imaging systems, manufacturing errors, assembly and alignment errors in the optics will deteriorate the overall imaging performance of the system. In X-ray imaging systems, X-ray scatter accounts for this inevitable deterioration. As a result, in the image, bright highlights will not appear as bright as they do in the object, and dark or shadowed areas will not be as black as those observed in the original patterns. In general an illuminated (or X-ray exposed) target can be defined by its spatial frequency (number of bright and dark areas per millimeter) and the contrast (the apparent difference in brightness between bright and dark areas of the image).

By convention, the modulation transfer function is normalized to unity at zero spatial frequency. For low spatial frequencies, the modulation transfer function is close to 1 (or 100%) and generally falls as the spatial frequency increases until it reaches zero. The contrast values are lower for higher spatial frequencies. As spatial frequency increases, the MTF curve falls until it reaches zero. This is the limit of resolution for a given imaging system or the so called cut off frequency. When the contrast value reaches zero, the image becomes a uniform shade of grey.

Traditionally, the measurements to determine the MTF of a digital imaging system are based on specific image acquisitions involving special phantoms such as slanted edges that are placed onto the detector.

However, recently, a new method has been described that allows the calculation of a PSF (point spread function) of a digital imaging system, that no longer requires the use of such special measurement acquisitions. As described in the EP application EP19150965.2 from Agfa NV with the title "Method and system to calculate the point spread function of a digital image detector system based on a Transfer function modulated quantum-noise measurement", the method allows the calculation of the PSF of the detector system based on generic clinical images that are generated during daily use and that partially may contain clinical information from a patient or object. This method has to be considered as incorporated into this application in its entirety, as the new proposed invention of this application relies entirely upon the method described in the referenced application.

It was the object of the referenced application to describe a calculation method to obtain a sharpness parameter (PSF) based on a digital image that comprises quantum noise (by nature), and therefore does not rely on the acquisition on especially designed phantom images.

It is the object of this invention to leverage the possibility to determine sharpness in a reliable way based on the usage of standard acquisitions made during daily practice without requiring special procedures or technical setups. The method will allow the reliable determination of a sharpness parameter that may be used for absolute comparison with other imaging systems, or for comparison with sharpness parameters obtained in the past. The invention will allow to obtain this sharpness measurement without the need to disturb the user in his daily work, or without the need to perform specialized measurements for this purpose. Also the invention will decommission the use of specialized (and often costly) measurement phantoms.

The invention will further provide the advantage that the image display systems' sharpness may be monitored continuously (and automatically) over time, without the intervention of a user or technician. Also may alerts or other events be triggered as soon as a sharpness threshold is exceeded, allowing a user to take the necessary actions to restore the intended sharpness or image quality.

SUMMARY OF INVENTION

The present invention provides a system and a method to determine a sharpness parameter automatically by inputting and using already acquired images from the digital imaging system as the input for the method to calculate the point spread function PSF of an image detector system, as set out in Claim 1.

In the context of this invention, the image detector system may be a visible light detector system comprising optics (such as used in a digital photo camera), but the method of the invention is not limited for use in the visible part of the light spectrum. It may also be applied to infrared or ultra-violet detector systems. The image detector system may also be a digital X-ray imaging system, consisting of a digital X-ray image detector. The invention may also be applied in astronomical imaging, electron microscopy, other imaging techniques such as 3D microscopy (like in confocal laser scanning microscopy) and fluorescence microscopy.

While the invention will be described in more detail in the context of digital X-ray imaging, it may thus be applied to other types of imaging detector systems as well, since there is no difference in the way the input signal (i.e. an image comprising a detectable amount of quantum noise) has to be acquired.

The digital image I[X,Y] referred to in this invention has to be understood as an image based on an acquisition which is made within the default parameter settings range of the image detector system. The image detector system should thus be configured and exposed such that the obtained image is neither underexposed nor overexposed (at least in the spatial sample area R[x',y']).

The digital image I[X,Y] is preferably suitably pre-calibrated, which means that certain hardware specific calibrations or corrections are applied to the image before subjecting it to the method of the invention. The pre-calibrations are for instance; 1) pixel value offset subtractions (removal of signal values caused by thermal effects in the image detector system), 2) pixel gain corrections (correcting the gain parameters applied to the signal amplification), 3) compensations for pixel-, cluster- and line defects.

One minimum requirement of said digital image I[X,Y] is that at least a portion from it (which is called the spatial sample area R[x',y']) is substantially homogeneously exposed. "Substantially" means in this context that there are no clear intended structural objects visible in the image that cause image signal variations against the recorded background of more than 1%. The method of the invention performs best when the only signal in the image sample area (after normalization) would only consist of transfer function modulated quantum noise, i.e. quantum noise that is modified (modulated) only by its passage through the image detector system. The quantum noise is induced during image acquisition due to the impinging photons on the digital image detector.

The sample area R[x',y'] has to be understood as a preferably contiguous sub-area of the digital image I[X,Y], of which all pixels are exposed under said substantially homogeneously exposure conditions. For a visible light image detector system, this would mean that all detector pixels in the sample area capture an homogeneously illuminated area of an object, which would show up in the image as a homogenously bright area.

For a digital X-ray imaging detector system, the sample area would preferably be an area in the image which is substantially homogeneously exposed by the X-ray source. For this purpose, a flat field exposure may be considered to be the most suitable way to achieve this objective. A flat field exposure, often referred to as a white field or gain field, is acquired with X-ray illumination, but without the presence of the imaged object. A flat field exposure thus offers homogeneously exposed sample areas over its entire surface. A sample area would also be considered as being substantially homogeneously exposed by an X-ray source, even when an object would be present in the X-ray beam on condition that the imaged object itself would have a substantially constant thickness.

A less obvious choice would be to try identifying suitable sample areas in clinical X-ray images that are comprising body parts of a patient. Nevertheless, most of such clinical images do offer opportunities to identify such areas, as the image area required for performing the method successfully is relatively limited. A suitable sample area spanning 100×100 pixels would largely suffice when applying a kernel size for $k_{i\times j}$ of 21×21. The most suitable areas are the ones wherein the digital image detector was directly exposed by the X-ray source (i.e. areas in the image which have not been obstructed by body parts of the patient), but this is not a strict requirement. Many conventional X-ray exposure techniques applied in daily practice result in images wherein the body part under investigation does not entirely cover the detector surface, meaning that there are directly exposed detector areas. These albeit limited directly exposed detector areas offer opportunities to identify such suitable sample areas.

In the context of this invention, a peripheral sensing kernel $k_{i\times j}$ is a mathematical representation of a set of symmetrically arranged pixels around a central point, this central point making up the center of the peripheral sensing kernel. This sensing kernel is called "peripheral" as its shape determines the periphery with respect to a central point wherein the PSF (point spread function) is calculated. The peripheral sensing kernel is symmetric around the x- and y-axis, and may take the shape of a square or a circle (for isotropic blurring), or a rectangle or an ellipse (for anisotropic blurring).

The size of the kernel $k_{i\times j}$ thus determines the accuracy (or resolution) at which the PSF is calculated. In practice, the size of kernel $k_{i\times j}$ is defined by $$i = 2n+1; n \in \mathbb{N}$$

and $$j = 2m+1; m \in \mathbb{N}$$

In the case that n=m, the kernel $k_{i\times j}$ is square or circular, and will be used for the determination of an isotropic PSF. In the other case, an anisotropic PSF (of which the width in x- and y-direction are different) will be obtained and a rectangular or elliptic kernel will be applied, having a different aspect ratio. The application of an anisotropic kernel is in this method advisable in case the image detector system is expected to behave differently in the x- and y-direction. This may be the case when using detector arrays with non-square pixels, or for instance when the detector read-out technique induces non-isotropic responses; which is for instance the case with different CR (computed radiography) digitizer systems. A CR digitizer may for instance read out a phosphor detector plate using a so-called "flying spot" laser which sweeps over the phosphor plate's surface, resulting in a line-by-line image (re-)construction. This results in an anisotropic pixel sensitivity due to the difference in read-out in the fast scan direction (direction of the line wise read-out) and the slow scan direction.

In case of an elliptic (where i≠j) or circular (where i=j) kernel $k_{i\times j}$, it has to be understood that only the pixels in the ellipse defined by its axes x and y around the central point are considered for the calculations. This is from the case where square or rectangular kernels are considered.

A pixel value background $B_L$ of a local pixel $L(x,y)$ is defined as the average of all of the image pixel values of the pixels that are located within a background region of interest that is centered on said local pixel $L(x,y)$. A background value $B_L$ is calculated for a certain pixel in a digital image in order to calculate the deviation of local pixel value of pixel $L(x,y)$ in comparison with its surrounding neighbors.

In this method, the initial choice of the size of the peripheral sensing kernel $k_{i\times j}$ determines the accuracy (resolution) of the PSF determination area, and thus the returned result.

The invention is advantageous in that the measurement signal that is used for the calculation of the point spread function (PSF) is an exposure that does not involve the application or use of special measurement patterns (digital photography) or phantoms (X-ray digital imaging). The invention thus allows the calculation of the PFS based on the use of standard image acquisitions, in the sense that no special measurement phantoms are required to obtain such a suitable input image.

Another advantage of the invention is that the obtained PSF can be used to calculate or derive the sharpness (MTF) of the image system from it, using the mathematical methods known in the art.

The present invention can be implemented as a computer program product adapted to carry out the steps as set out in the description. The computer executable program code adapted to carry out the steps set out in the description can be stored on a computer readable medium.

Since the method of this invention can be implemented as a computer program that it is instructed to select a suitable input image (that is acquired under substantially homogeneously exposure conditions) from a set of available input images (that are for instance created during the normal operations of a radiology department service), it may furthermore be implemented as sharpness monitoring service, that continuously calculates and monitors the sharpness of a digital imaging system. Such computer program may be configured to respond to changes in sharpness measurements, or to respond when certain thresholds are exceeded. The computer program may for instance trigger a maintenance operation to be executed on the digital imaging system. The enormous advantage of this method is that no scheduled and intrusive image quality measurements have to be performed at regular intervals at the expense of operational time of the system, and that all measurements can run in the background without any disturbance for the user (due to scheduled interventions of the operator).

Further advantages and embodiments of the present invention will become apparent from the following description and drawings.

Figure 1:
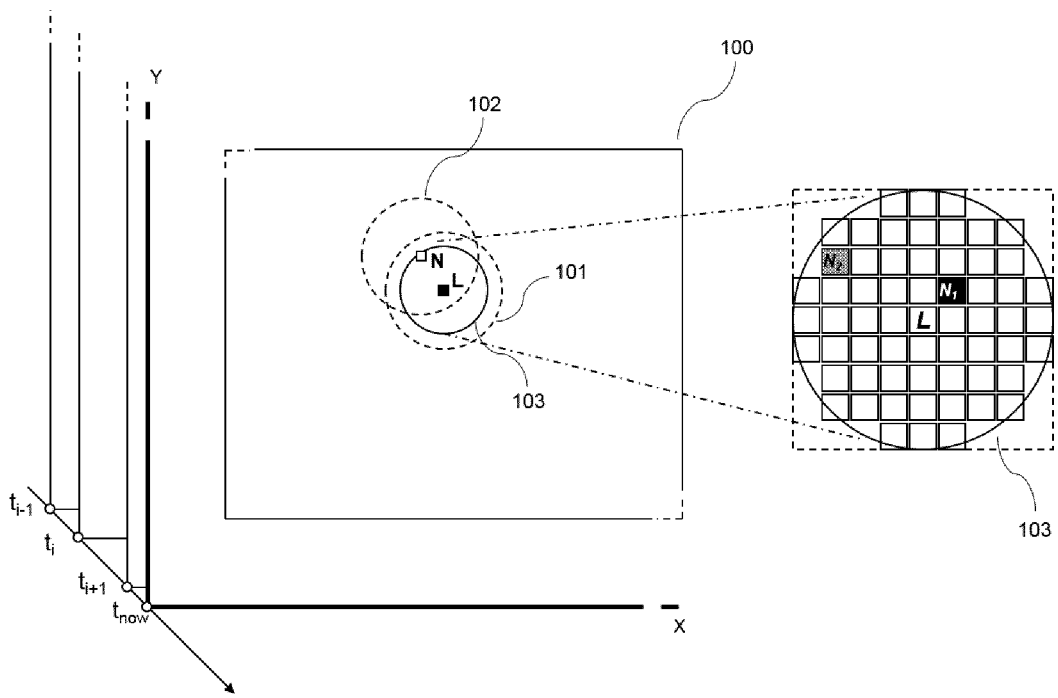
FIG. 1: shows a spatial representation (marked by an X-/Y-axis) and a temporal representation (indicated by $t_{i-1}$, $t_i$, $t_{i+1}$, $t_{now}$) of a digital image $I[X,Y]$ (of size X×Y) captured by a digital image acquisition system. The area [100] represents a sample area R within the image I that comprises image data meeting the requirements for performing the method. The diagram depicts the relative locations of a local pixel "L" and a neighbourhood pixel "N" within their selected background region of interest (respectively [101] and [102]). [103] represents the point-spread-function determination area around the local pixel "L". The final calculated PSF (which is the calculation result of the method of this invention) will fit into this PSF determination area, and determines the accuracy (resolution) of the calculated result.

The exploded view on the right side of the drawing depicts a spatial arrangement of a local pixel L, a close neighbour pixel $N_1$ and a far neighbour pixel $N_2$, all part of a sample area located in the digital image, as located inside the point-spread-function determination area perimeter [103] of said local pixel.

Figure 2A:
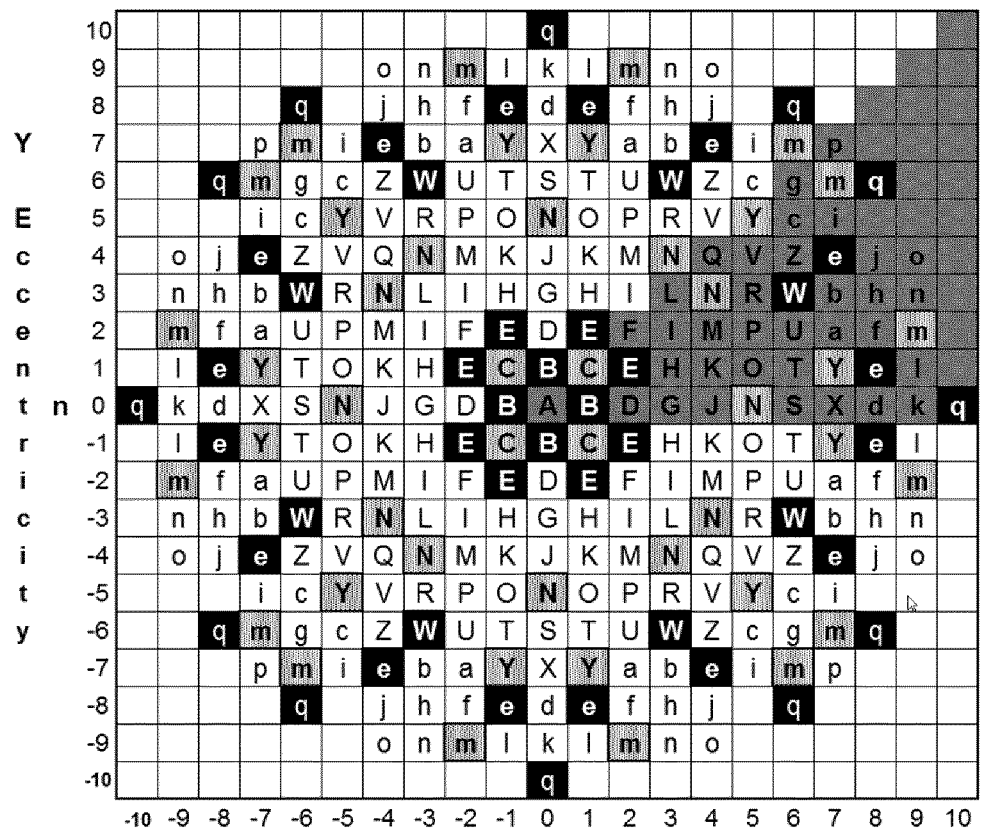

FIG. 2a: shows a spatial arrangement of a circular peripheral sensing kernel of size 21×21, in which groups of pixels with identical eccentricities are shown as a character symbol. All pixels that are marked with the same character symbol are neighbouring pixels $N_d$ of the central pixel (which is marked "A") that are lying at a same distance d. It should be noted the different groups of $N_d$ may be considered to be located on concentric circles. Such a circular peripheral sensing kernel will be used for the analysis of isotropic sharpness.

Figure 2B:
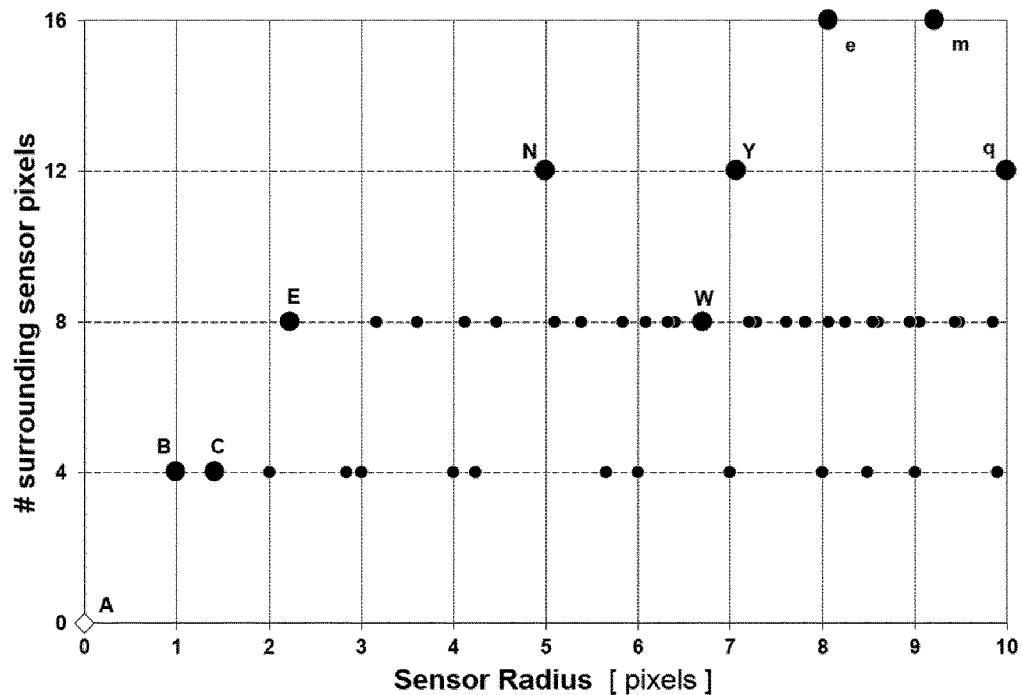

FIG. 2b: shows the frequency distribution (i.e. the number of members in group of pixels sharing the same distance d from the central pixel) of the peripheral sensing kernel of FIG. 2a of size 21×21, and this in function of their respective eccentricities (i.e. their distances from the central pixel L).

Figure 3A:
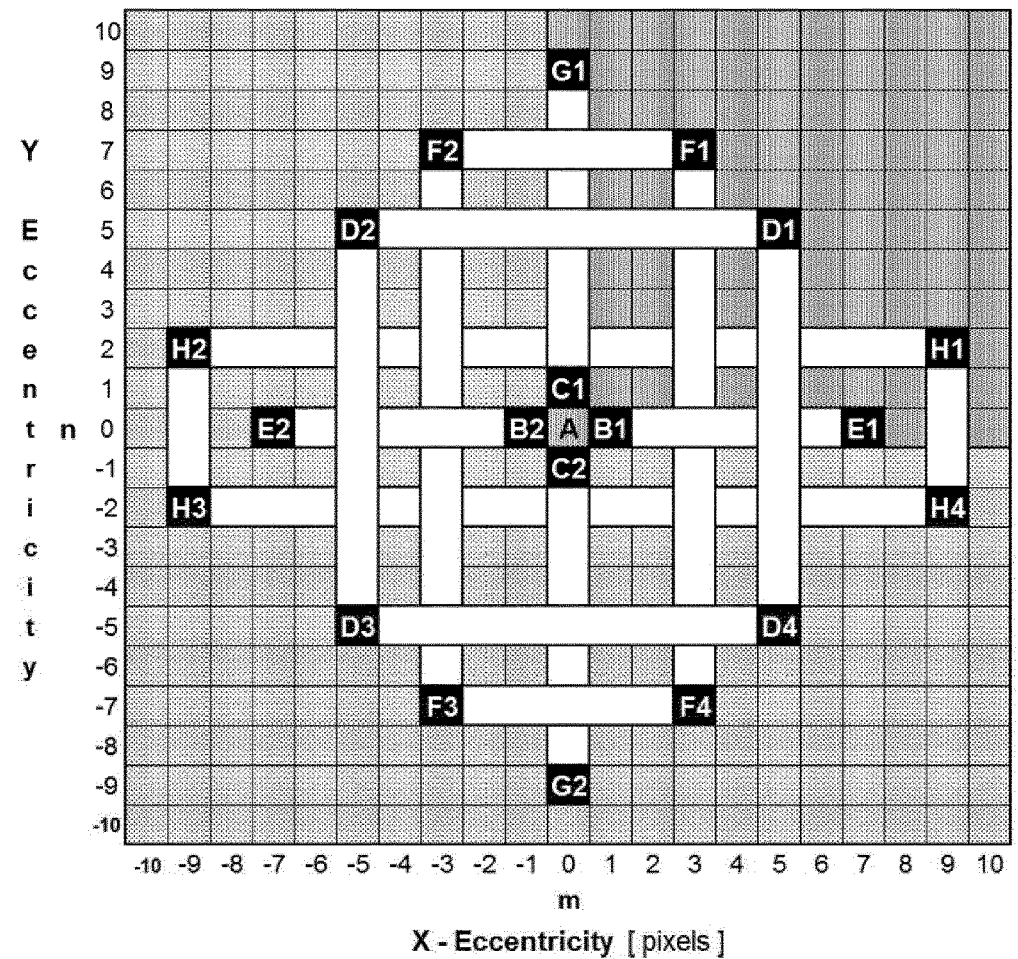

FIG. 3a shows a spatial arrangement of a peripheral sensing kernel in which groups of pixels with identical eccentricities, but different directions are grouped, and are marked with the same capital letter. The groups of neighbouring pixels lying at the same distance d from the central pixel (marked with "A") are located at the corners of a rectangle. Such configurations of a peripheral sensing kernel are used for the analysis of anisotropic sharpness.

Figure 3B:
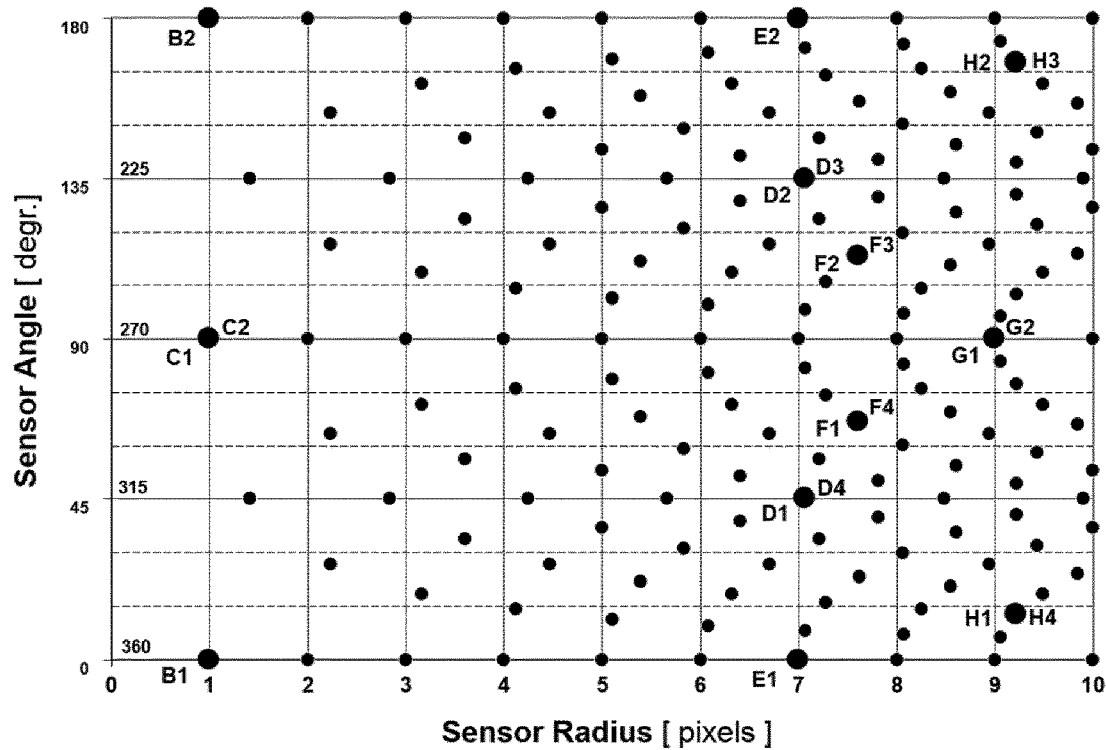

FIG. 3b shows the angular distribution of the peripheral sensing kernel of FIG. 3a., and this in function of their respective eccentricities (i.e. their distances from the central pixel L).

Figure 4A:
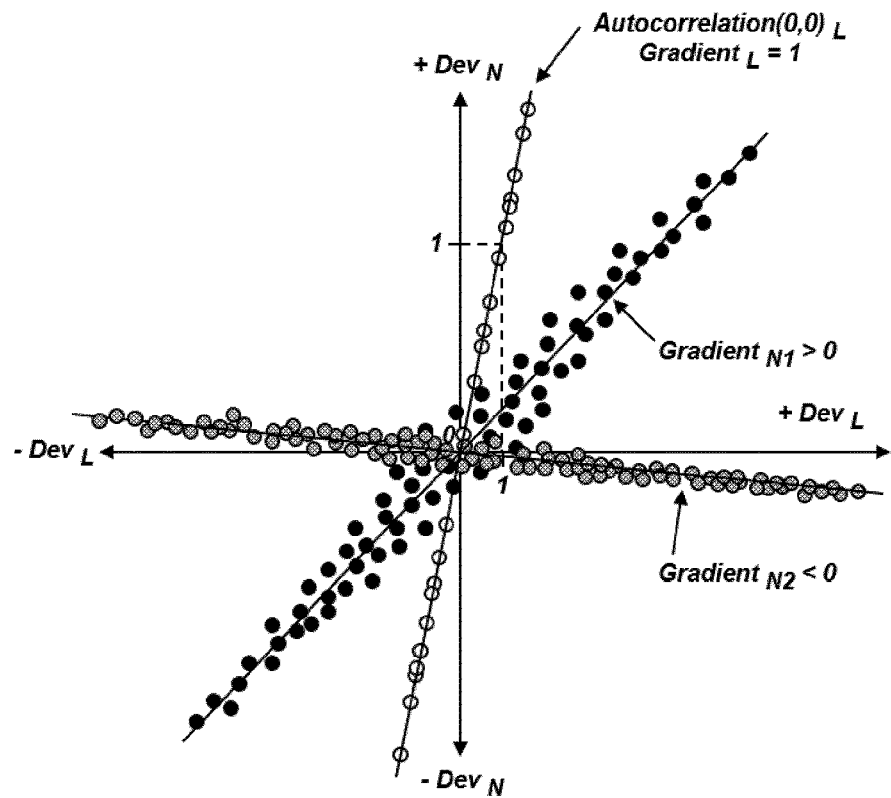

FIG. 4a: shows a graph representing the background-deviation of a chosen, local pixel L on the horizontal axis and the related background-deviations of a selected close neighbour pixel $N_1$ and of a selected far neighbour pixel $N_2$ on the vertical axis along with the autocorrelation gradient reference line of the chosen, local pixel. Each slope gradient represents a correlation coefficient between said background deviation of the local pixel L and the background deviation of a neighbouring pixel $N_d$ at a certain distance d from the local pixel L. The different measurement points grouped around the slope gradient (gradient$_{N1}$, gradient$_{N2}$, . . . ) are obtained through similar calculations for different pixels L in the sample area. More measurement pixels will lead to a better estimation of the correlation coefficient for a certain number of pixels at same distances d.

Figure 4B:
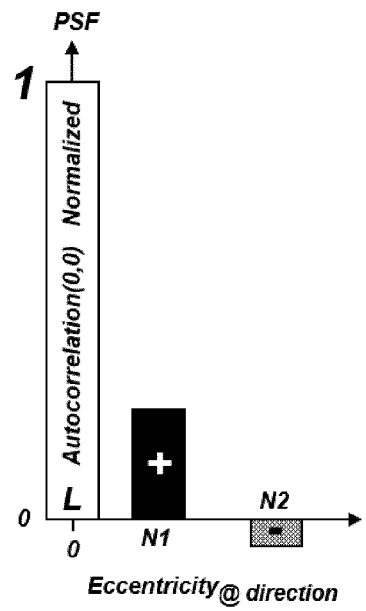

FIG. 4b: shows a Point-Spread-Function bar-graph representing the calculated individual, positive and negative spatial correlation coefficient results relative to the autocorrelation peak normalized correlation integral for all the local pixels inside the selected region of interest (sample area) located in the digital image.

Figure 5:
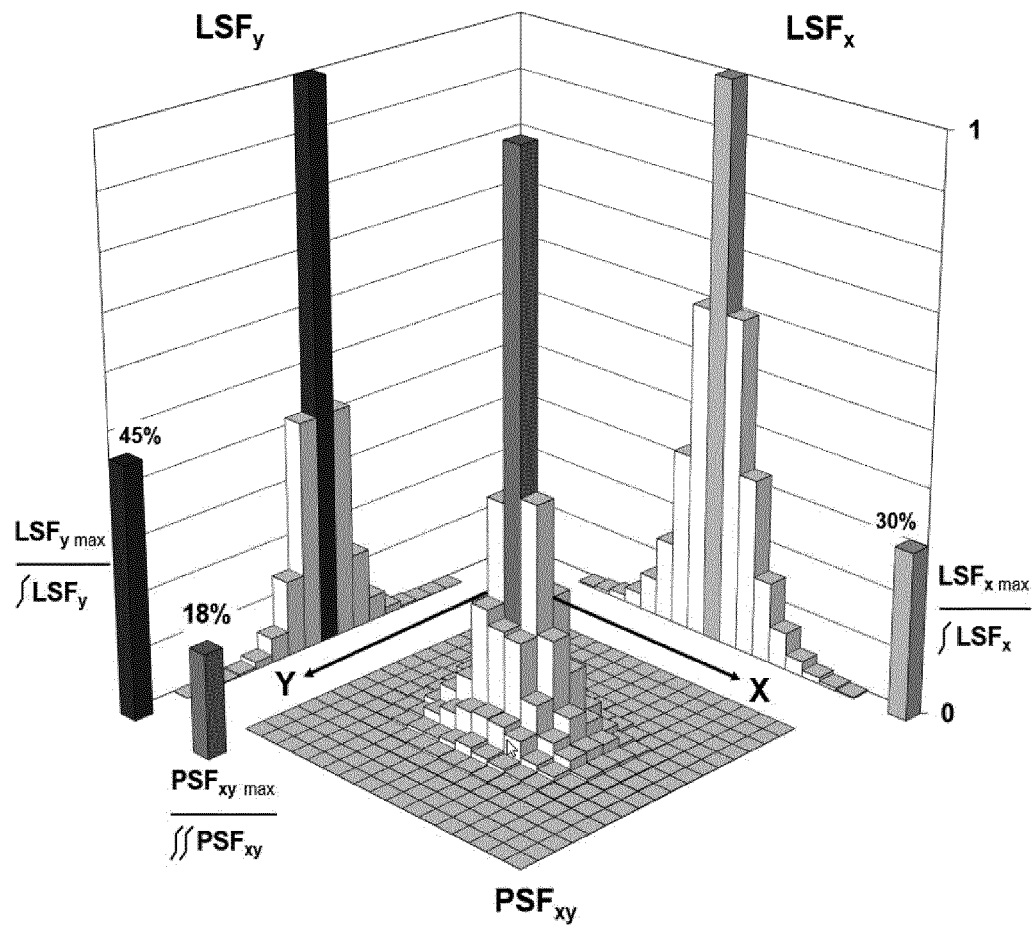

FIG. 5: shows the spatial and planar representations of the calculated Point-Spread-Function components and their calculated corresponding Line-Spread-Functions in both main directions of the digital image along with their Center-to-Total Fraction ratios.

Figure 6:
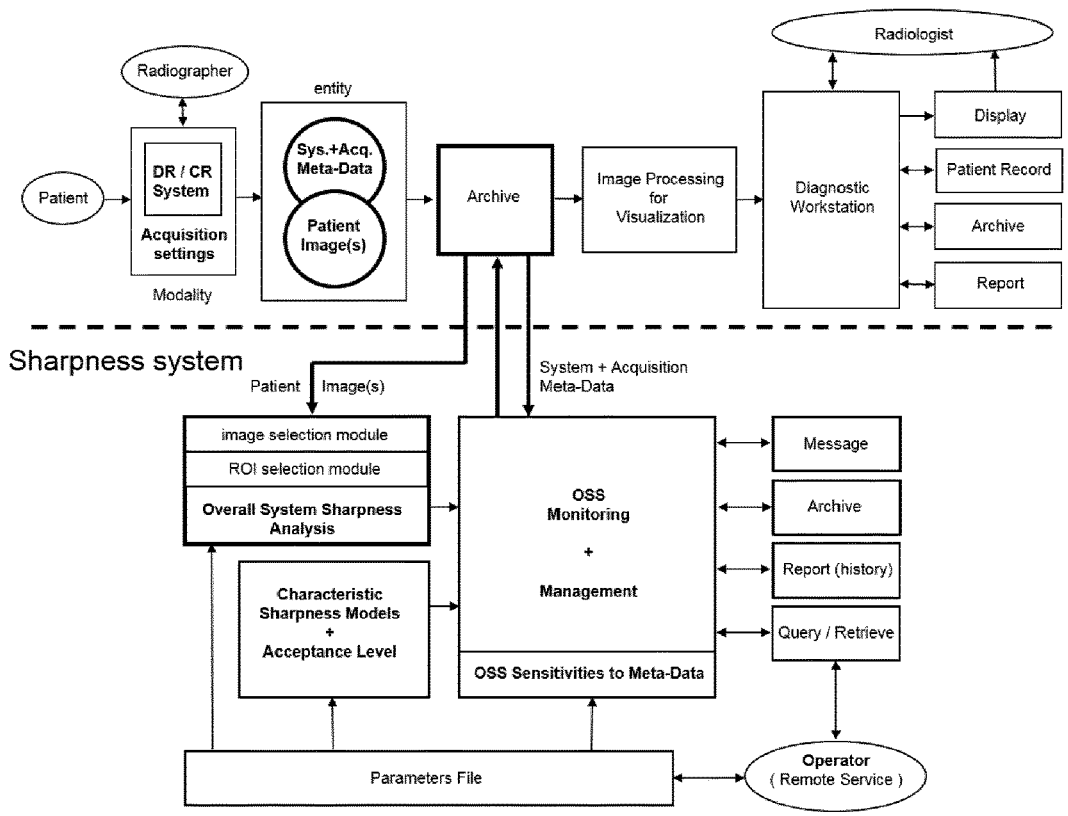

FIG. 6: illustrates a possible embodiment of a sharpness monitoring system (lower portion) that is integrated with an imaging modality (upper portion). The upper part of the image illustrates the interaction of the radiographer with the patient using a CR- or DR-system to acquire an image or study. These acquired images are stored in an archive which either may be (in the standard workflow) be processed for visualisation and consulted on a radiology workstation by a radiologist. The lower part of the diagram shows the overall system sharpness (OSS) monitoring system, which consults the archive to retrieve images of a patient which are acquired in clinical practice. These images are selected in case that they are useable for the sharpness calculation algorithm, and subjected to an analysis of the image wherein the most suitable regions of interest (ROI) are identified to use as a spatial sample area R[x',y'] in the calculation method of the point spread function PSF$_{xy}$ of said digital image detector system. The stability of the obtained sharpness parameter may then subsequently be stored for future comparison, and stability monitoring. Acceptance levels may be programmed and applied for monitoring the sharpness of the system. The system may be further foreseen with a message system for alerting an administrator in case a tolerance is exceeded. Alternatively, the measurement values may be archived for future reference or reporting.

Figure 7:
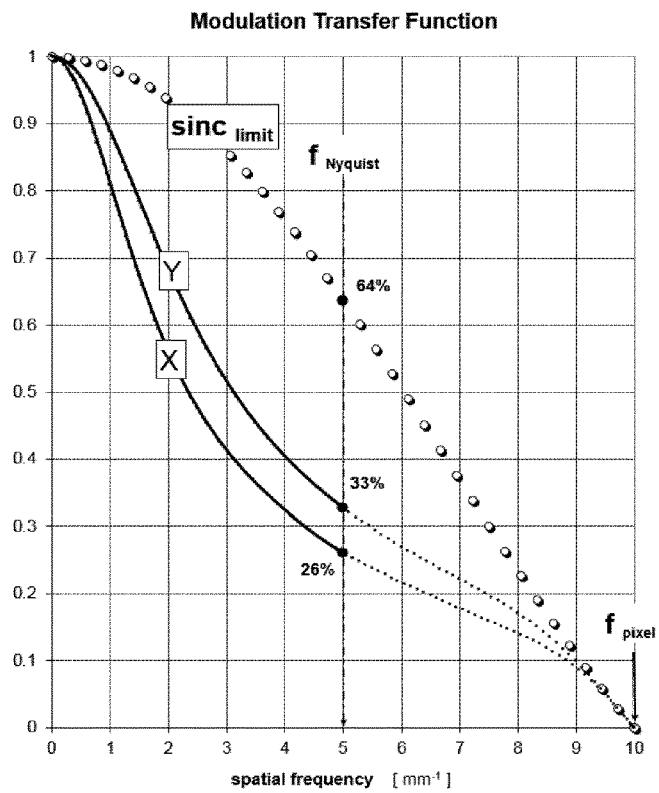

FIG. 7: shows the bi-directionally analyzed overall system sharpness results expressed as the Modulation Transfer Function graphs; MTFx and MTFy, which are calculated by Discrete Fourier Transforming their corresponding peak-normalized Line Spread Function graphs; LSFx and LSFy, presented in FIG. 5. These sharpness curves, which are calculated for both perpendicular main image-directions (X and Y), are presented together with the dotted line graph of the pixel-size limited and sinc-function shaped MTF performance which is characteristic for a digital image acquired by an imaging system which exhibits ideal overall system sharpness. This ideal sharpness MTF profile (represented by the heavy dotted curve) added for reference here, is typical for single pulse Point Spread Function and Line Spread Function profiles. All MTF curves start at unity for a zero spatial frequency x-ray signal input into the digital imaging system. X-ray input signals at a spatial frequency equal to the pixel-sampling frequency generate a zero MTF.

Figure 8:
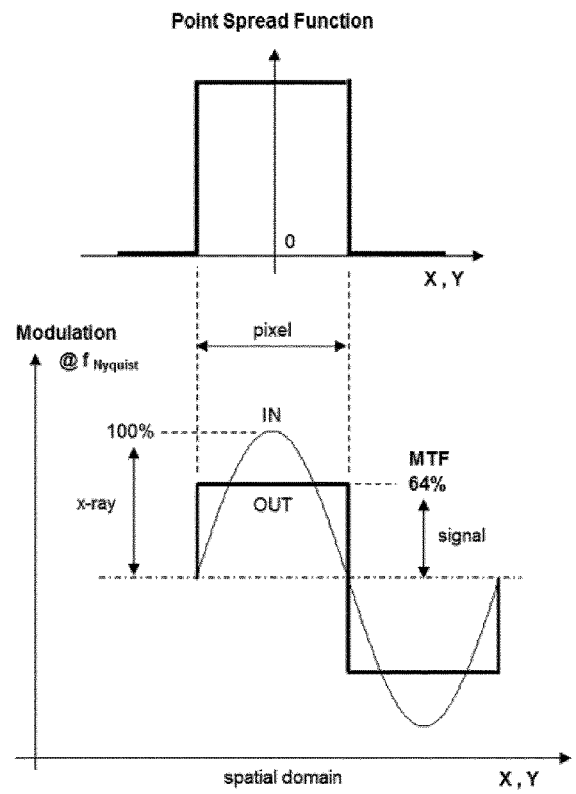

FIG. 8: the dotted ideal sharpness MTF value of 0.64 at the Nyquist spatial frequency represents the near 64% pixel-sampled signal-swing obtained in the digital image at the output of the imaging system chain which results from a sinusoidal x-ray 100% signal-swing injected at the input of the imaging system. The MTF-value at the Nyquist spatial frequency is an ideal parameter to capture system sharpness in a single figure.

Figure 9:
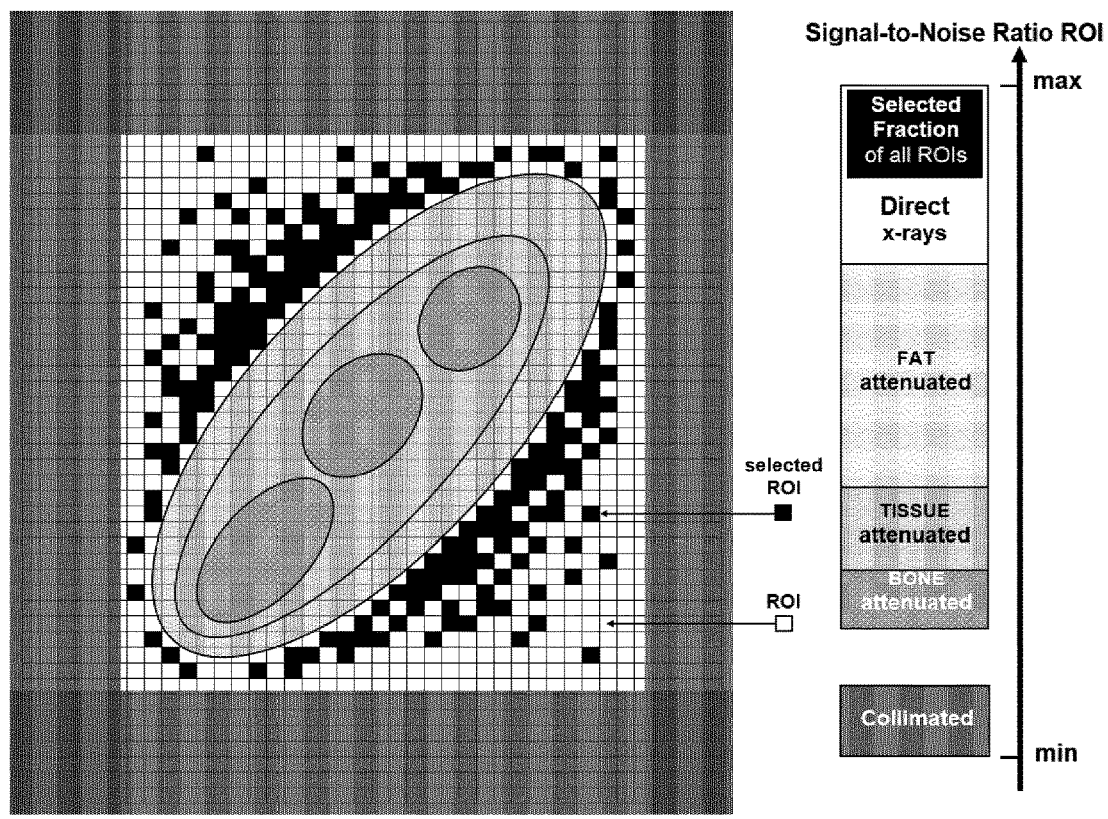

FIG. 9: the drawing represents a schematic representation of a grayscale radiographic image acquired by a square shaped digital image detector. The small squares dividing the square shaped image area into smaller squares represent the candidate regions-of-interest (ROI's). The drawing indicates which areas of a typical radiographic image are preferably suitable for use by the sharpness algorithm (indicated as "selected ROI"). These are essentially the areas in the image where the X-ray directly hit the image detector, and where the signal-to-noise ratio is maximal. In the image, an object or patient is visible (represented by the elliptical shapes). The darker rectangular shapes along the four edges of the image represent the collimated parts of the image to reduce the exposed area. The entire image is partitioned into smaller square-shaped ROI's, for use by the sharpness algorithm as a spatial sample area [100]. The right side of the drawing represents the legend for the differently exposed areas of the digital image.

DESCRIPTION OF EMBODIMENTS

In the following detailed description, reference is made in sufficient detail to the above referenced drawings, allowing those skilled in the art to practice the embodiments explained below.

The method of the invention intends to automatically select and process a series of acquired images for the purpose of determining the sharpness of a digital imaging system from them. The method and system intends to perform a selection on the available images in a pool of images that have been acquired by this digital imaging system over a recent past period. The dates of the image acquisitions have to be associated with the sharpness results derived from the images for this period, in order to be able to draw conclusions on the overall system sharpness (OSS) as a function of use-time.

As a first step, the system of the invention will determine when and how many images are transferred to the sharpness monitoring system. In principle there are no real restrictions to how many images are analysed by the system; it would in principle be possible to present each individual image to the sharpness monitoring system. A possible approach could be to present a few suitable images per day to the sharpness monitoring system for analysis (in the assumption that the imaging system is being used on a daily basis). Preferably, these daily images would be acquired during the day-time (and not as a first image of the day, when the components would not have achieved their operational temperatures). A daily sharpness measurement could therefore be recorded, which could then be analysed in order to identify any significant trends of the sharpness of the system. The above mentioned functions are performed by the input module of the system.

After an image is presented for analysis, it is analysed by the image selection module to evaluate whether the minimal criteria to use the image for a sharpness measurement are met. These minimal criteria focus on the presence or absence of a minimal size of area in the image which shows a sufficiently homogeneous exposure, a sufficient image signal amplitude, and obviously also comprises optical transfer function modulated quantum noise (it should in any case be avoided that this quantum noise would be filtered out by a preprocessing step). "Sufficiently homogeneous" means in this context that it should be avoided that anatomy- or object structures in the image could disturb the analysis algorithm; the skilled person will acknowledge that this requirement would mean in practice that the image should be sufficiently "flat" in these areas (i.e. that preferably the variations should not exceed 1%, or at least should not exceed 5-10%), or that the image may be corrected such that the image becomes sufficiently flat (but that, at the same time, the quantum noise is not affected by filtering). The "sufficient image signal amplitude" leads to a preference of directly exposed areas of the detector over image areas that are attenuated by any material (object, patient, collimator, . . . ).

It is therefore that the image selection module in one preferred embodiment is configured to identify the presence of directly exposed areas of the image detector. The detection of these particular directly exposed areas may be based on known image processing techniques, such as thresholding, segmentation techniques or alike, or may be based on information provided in the tags of the image headers. In case that the image selection module positively identifies an image with such an image area, the image is passed onto the ROI selection module.

In another embodiment, the image selection module may be configured to also accept images wherein other sufficiently homogeneous areas (which were not necessarily directly exposed by the X-ray detector) may be accepted as suitable. An image processing step would in this case require that certain areas could be identified based on their homogeneity only, or for instance on knowledge about certain exposed areas of a human body which could allow such homogeneously exposed areas.

As a next step, and in case that an image has been accepted by the image selection module, the accepted image is transferred to the ROI (region of interest) selection module. This ROI selection module will essentially re-use the above mentioned image processing and segmentation techniques to identify at least one (and preferably more than one) ROI in said contiguous and substantially equally exposed image area of said selected digital image I[X,Y], which meets the desired size requirements for such a ROI. As explained above, the size of a ROI should preferably largely exceed the size of the peripheral sensing kernel, as this peripheral sensing kernel will be convoluted within the boundaries of this ROI. This peripheral sensing kernel determines the size of the returned PSF result.

It is advantageous for the accuracy of the sharpness calculation that multiple convolutive calculations can be performed for the same image (but in different areas of it), as it will improve the accuracy of the result obtained.

The next and final step is then to pass the selected ROI's on to the calculation algorithm that will calculate the PSF of the imaging detector system from the at least one ROI. The mathematical method, returning the PSF value (and thus the measure for its sharpness) is described below.

The calculation method of the invention intends to calculate the PSF (point-spread function) of a digital detector system based on a sufficiently large amount of sample data acquired by said digital detector system. As such, two very different ways of collecting such sufficiently large amount of data can be considered; the first is to identify the large number of samples in the spatial domain (meaning that the data are collected at different locations in the image), the second is to identify the samples in the temporal (time) domain (meaning that the different sample data are collected in images created at different moments in time). In the following explanation, further emphasis will be given to the embodiment in which the spatial domain is sampled to obtain the required data.

In a preferred embodiment, will the method require that a so-called sample area, which may be preferably square or rectangular in shape and whose surface area is preferably (but not necessarily) contiguous, can be obtained from an image that is acquired by the digital detector system in question. The sample area R is thus defined as a selected portion of the digital image I:

$$R \subset I$$

Since the method of the invention is based on the analysis of the quantum noise that is modulated by the transfer function of the digital imaging system, it is a prerequisite that this quantum noise may be extracted from the data in the sample area, and its surroundings (see further). It is therefore preferable that no objects would obstruct the sample area during exposure, such that the measurements of the quantum noise could be disturbed. It is thus preferable to select the sample area in the digital image such that the pixels of the sample area are exposed under substantially homogeneously exposure conditions, meaning that their respective measurement values would be influenced by variations induced by quantum noise rather than disturbances on the surface of the imaged object (for visible light) or disturbances induced by in homogeneities obstructing the digital X-ray detector during exposure (for radiographic images). For a visible light image detector system, this would mean that all detector pixels in the sample area capture an homogeneously illuminated area of an object, which would show up in the image as a homogenously bright area. For a digital X-ray imaging detector system, the sample area would preferably be an area in the image which is substantially homogeneously exposed by the X-ray source.

As a next step, in a preferred embodiment of the invention, the sample data acquired as unprocessed data, may subsequently pre-processed in such way as to remove the DC component from the image signal as much as possible.

This may be achieved by for instance destriping (taking out known column- or row-artefacts that may occur in certain imaging devices), and/or for instance by normalization, meaning that the values of the pixels in the sample area R are divided by their mean value (i.e. the sum of all pixel values in the background region of interest divided by the number of pixels in the background region of interest). This way, any known background signal is removed from the data in order to obtain a raw data set that only contains the transfer function modulated quantum noise.

The next step is the selection of the peripheral sensing kernel $k_{i \times j}$ which is essentially defined by its shape and size. The peripheral sensing kernel defines the set of pixels N around a local pixel L(x,y) that will be evaluated to assess whether (and how much) their (pixel) value deviates from the local pixel value from L(x,y) (local pixel L is an element of sample area R, and has coordinates (x,y)):

$$L(x,y) \in R[x',y']$$

The peripheral sensing kernel thus defines which neighboring pixels N will be evaluated to see whether or not their pixel value can be correlated with the local pixel in the image sample (or with the central pixel of the sensing kernel k). This correlation is not a straightforward process that can be directly applied to the local pixel value and the neighboring pixel values, as will be explained hereafter. The term "sensing" kernel is chosen because the kernel will be moved and applied along all pixels in the sample area R.

The selection of the size of the sensing kernel $k_{i \times j}$ determines the accuracy and extent for which the PSF will be calculated; therefore its size should be chosen to match the expected size of the outcome for a certain digital image detector system. The size of the sensing kernel is expressed in pixels x pixels, and thus matches the true dimensions of the pixel matrix if the imaging detector itself.

The shape of the peripheral sensing kernel may be chosen to be circular or square when it is expected that the digital image detector system shows isotropic behavior. This means that it is expected that the sharpness of a pixel is expected to be independent of the direction pixels; the sharpness is equal in both X- as Y-direction. The shape of the peripheral sensing kernel may be chosen to be elliptic or rectangular in the case that the digital image detector system is expected to perform differently in X- and Y-direction, or that it shows anisotropic behavior. The choice between a circular or square kernel is not very important for the accuracy of the calculated result, but a square shaped kernel may be more practical when performing the calculations with a computer system.

In the next step of the method of this invention, the calculation of the PSF is explained for one local pixel L(x,y) that is selected from the sample area R that was defined as above. Later on, the same calculation will be performed for all pixels within the sample area R[x',y'] in order to obtain more accurate results thanks to a higher number of samples.

For one pixel L(x,y), first, its background-deviation is calculated, this background deviation being the deviation of the pixel value at pixel L(x,y) relative to its own background value $B_L$. The background value $B_L$ is calculated as the median or the average value of all values in the so-called region of interest around pixel L(x,y) (refer to FIG. 1 as [101]). The deviation of the pixel value at pixel L(x,y) is thus a measure of the local signal intensity normalized against its own background, $$\Delta L = \left[\frac{L}{B_L}\right] - 1$$

Subsequently, but still for the same pixel L(x,y), secondly, a calculation is made for each group of neighbouring pixels $N_d$ that share the same distance d from pixel L(x,y) in the peripheral sensing kernel $k_{i \times j}$. Said group of neighbouring pixels $N_d$, comprises the pixels $N_{d1}$, $N_{d2}$, ..., $N_{dn}$, also noted as $N_{d(1 \to n)}$. These groups of neighbouring pixels $N_d$ are shown in FIGS. 2a and 3a as having the same character symbol. The n corresponds to the "# of surrounding sensor pixels" for a certain eccentricity d as illustrated in the example of FIG. 2b.

$N_d$ is the value of a neighbouring pixel N of L(x,y) that is located at a distance d from pixel L(x,y). In other words, $N_d$ is the value of a neighbouring pixel N of L(x,y) with eccentricity d.

Thus, for each group of neighbouring pixels $N_d$ that share the same distance d from pixel L(x,y), the median (or mean) deviation $\Delta \overline{N}_d$ of all background normalized neighbouring pixels $N_{d(1 \to n)}$ at the same distance d from L(x,y) is calculated as, $$\Delta \overline{N}_d = median_{i=1}^{n}\left[\left[\frac{N_{d(i)}}{B_{N_{d(i)}}}\right] - 1\right] \text{ or,}$$

$$\Delta \overline{N}_d = mean_{i=1}^{n}\left[\left[\frac{N_{d(i)}}{B_{N_{d(i)}}}\right] - 1\right]$$

wherein $\overline{N}_d$ is the median (or alternatively, mean) pixel value of all $N_{d(1 \to n)}$ at a same distance d(from L(x,y)), whereas the background value $B_{N_d}$ of each $N_{d(1 \to n)}$ is calculated as the median (or mean) value of all values in the so-called region of interest around pixel $N_{d(1 \to n)}$ (refer to FIG. 1 as [102]).

As a next step, we calculate the autocorrelation peak value for the sample area R[x',y'] by autocorrelating ΔL for all local pixels L(x,y) in the sample area for a spatial phase shift (0,0) pixels (i.e. no spatial phase shift) as follows:

$$\text{AutoCorrelationPeak}(R[x',y']) = \Sigma\Sigma_{x=0, y=0}^{R[x',y']} \Delta L^2$$

This autocorrelation peak value is a single value that is calculated for the entire sample area, and will be used later on to normalize the correlation values of ΔL with $\Delta \overline{N}_d$ for a distance d from local pixel L(x,y).

Subsequently, for all pixels in the sample area R[x',y'] the correlation between ΔL and $\Delta \overline{N}_d$ for the different distances (or eccentricities) d from the central pixel is calculated. This is achieved by summing the correlation values of ΔL with Δ$\overline{N}_d$ for a distance d from local pixel L(x,y) over all pixels in the sample area R[x',y'], as follows:

$$\text{Correlation}(\Delta L, \Delta \overline{N}_d) = \Sigma\Sigma_{x=0,y=0}^{R[x',y']} \Delta L \cdot \Delta \overline{N}_d$$

Different correlation values are thus calculated for the different distances (or eccentricities) d.

The PSF($N_d$) or the point spread function value for that group of neighbouring pixels $N_d$ is calculated as the auto-correlation peak normalized correlation value for that group of neighbouring pixels $N_d$:

$$PSF(N_d) = \frac{\text{Correlation }(\Delta L, \Delta \overline{N}_d)}{\text{AutoCorrelationPeak }(R[x', y'])}$$

Each calculated value PSF($N_d$) corresponds to a PSF$_{xy}$ value for all pixel at the pixel locations $N_{d1}, N_{d2}, \ldots, N_{dn}$, that are sharing the same group of neighbouring pixels $N_d$ around central pixel L. Or when referring to FIG. 2a or 3a, the calculated value PSF($N_d$) returns the PSF$_{xy}$ value for all the pixels labelled with a same character (in FIG. 2a) or same character prefix (in FIG. 3a). When calculating the above PSF($N_d$) values for all groups of neighbouring pixels $N_d$ around a central pixel, we obtain the entire 2-dimensional point spread function PSF$_{xy}$. This 2-dimensional point spread function PSF$_{xy}$ is obtained as a 2-dimensional matrix in the shape and size of the selected peripheral sensing kernel $k_{i \times j}$.

The obtained result is a two dimensional matrix PSF$_{xy}$ (see FIG. 5) that can be easily converted into a line spread function (LSF) in either direction X or Y by summing up all row values of the matrix onto a one-dimensional array (which may then be normalized again).

Also other sharpness related quality parameters may be calculated from the above PSF data using methods described in the art. Reference is made to the notes to FIG. 7 and FIG. 8, wherein the calculation of—for instance—the MTF value at Nyquist spatial frequency (which is the industry-acknowledged sharpness parameter for a digital imaging system) is further illustrated: the Modulation Transfer Function graphs; MTFx and MTFy, are calculated by discrete Fourier transforming their corresponding peak-normalized Line Spread Function graphs; LSFx and LSFy.

Conclusively, it has to be noted that the choice of the size of the sensing kernel thus also defines the size requirement of the sample area around the local points L(x,y) which are going to be investigated. Since i×j pixels N around local pixel L(x,y) are going to be considered for assessing their correlation with their respective backgrounds $B_N$ (which again expands the need for suitable measurement data around these neighbouring pixels N), the area around the actual set of local pixels that can be subjected to the calculation of this method should be expanded with the radius of the peripheral sensing kernel $k_{i \times j}$ [103] and the radius of the region of interest [102] of N. The sample area must thus be sufficiently large as to cover for each measurement point a surface that exceeds the selected sensing kernel $k_{i \times j}$ [103] expanded with the considered region of interest [102] for each of the pixels in said sensing kernel $k_{i \times j}$. This means that in practice that the useable pixels in the sample area will be limited to the pixels which lie at approximately 2 times the sensing kernels' radius away from the sample area's edge (assuming that the size of the sensing kernel $k_{i \times j}$ is (almost) the same as the background considered per neighbouring pixel N).

Therefore, alternatively, the sample area (although preferably covering a contiguous surface) may also be conceived as a randomly scattered set of isolated pixels that are distributed across the image area, provided that the regions of interest [102] of all neighbouring pixels N of the local pixel L meet the same acquisition criteria as discussed earlier for the sample area.

When implementing a sharpness monitoring system, it is required that such a system is capable of calculating sharpness data for the digital imaging system, but also that it can store these data for future comparison. Such a system thus additionally at least requires a processor and a memory to first calculate the sharpness data, and then to store them alongside the date and time information of the image acquisition. The sharpness monitoring system may be configured to simply record the data, and for instance create a report about the sharpness evolution of the system over a past period, or may be configured to for instance alert an administrator or user in a case where a sharpness parameter exceeds a certain threshold. In a case where it is observed that the sharpness of a system suddenly drops or declines, an appropriate action can then be taken to readjust or repair the imaging system.

The advantage of this sharpness monitoring system is that it can run and be active in an un-supervised way; the calculation method described above allows that the sharpness is calculated on a regular basis without requiring any user intervention. It Is therefore thanks to this mathematical implementation that a sharpness monitoring system may be operated without any need to—for instance—make specific technical image acquisitions or to interrupt normal system usage.

The invention claimed is:

1. A method to determine the sharpness of a digital imaging system, comprising the steps of:
   receiving at least one digital image that is acquired on said digital imaging system as input, said digital image comprising transfer function modulated quantum-noise,
   selecting from said digital images at least one selected image I[X,Y] that comprises a contiguous and substantially equally exposed image area,
   determining at least one ROI in said selected image I[X,Y] that comprises a contiguous and homogeneously exposed image area,
   assigning said ROI as a spatial sample area R[x',y'] in a calculation method to determine a point spread function PSF$_{xy}$ of said digital image detector system, comprising the steps of:
   acquiring a set of image pixel values comprising transfer function modulated quantum noise in a spatial sample area R[x',y'] of a digital image I[X,Y] that is substantially equally exposed,
   determining a peripheral sensing kernel $k_{i \times j}$ wherein the pixel values matrix k[x,y] is centred on a central pixel,
   calculating for each local image pixel L(x,y) in said sample area R[x',y']:
      a pixel deviation $\Delta L$ between a pixel value at pixel L(x,y) and its background value $B_L$, wherein $B_L$ is defined as the median or mean value of all values in a background region centred on said local pixel L(x,y), and
      a median or mean pixel deviation $\Delta \overline{N}_d$ of all background normalized neighbouring pixels values $N_{d(1 \to n)} = N_{d1}, N_{d2}, \ldots, N_{dn}$ that are located at the same distance d from said local image pixel L(x,y) and that are normalized against their respective background value $B_{N_{d(i)}}$, wherein $B_{N_{d(i)}}$ is defined as the median value of all pixel values in a background region $B_{N_{d(i)}}$ centred on said neighbouring pixels $N_{d(i)}$,
   calculating an autocorrelation peak value by autocorrelating $\Delta L$ for all local pixels L(x,y) in the sample area R[x',y'], as $$\text{AutoCorrelationPeak}(R[x',y']) = \Sigma\Sigma_{x=0, y=0}^{R[x',y']} \Delta L^2$$

calculating PSF$_{xy}$ as $$PSF(N_d) = \frac{\text{Correlation } (\Delta L, \Delta \overline{N}_d)}{\text{AutoCorrelationPeak } (R[x', y'])}$$

for all values of d from a central pixel as defined in peripheral sensing kernel $k_{i \times j}$, where Correlation($\Delta L, \Delta \overline{N}_d$) is obtained by correlating $\Delta L$ with $\Delta \overline{N}_d$ for a distance d from local pixel L(x,y), and by summing the results over all pixels in the sample area R[x',y'], $$\text{Correlation}(\Delta L, \Delta \overline{N}_d) = \Sigma\Sigma_{x=0,y=0}^{R[x',y']} \Delta L \cdot \Delta \overline{N}_d.$$

2. The method according to claim 1, wherein said ROI in said selected image I[X,Y] was contiguous and directly exposed by an X-ray source.

3. The method according to claim 2, wherein said point spread function $PSF_{xy}$ is converted into a sharpness parameter, such as an MTF function.

4. A computer program comprising instructions which, when the program is executed by a computer, cause the computer to carry out the steps of the method of claim 3.

5. A computer readable medium comprising instructions which, when the program is executed by a computer, cause the computer to carry out the steps of the method of claim 3.

6. A computer program comprising instructions which, when the program is executed by a computer, cause the computer to carry out the steps of the method of claim 2.

7. A computer readable medium comprising instructions which, when the program is executed by a computer, cause the computer to carry out the steps of the method of claim 2.

8. The method according to claim 1, wherein all exposure values of all pixels in said ROI in said selected image I[X,Y] exceed a predetermined threshold value.

9. The method according to claim 8, wherein said point spread function $PSF_{xy}$ is converted into a sharpness parameter, such as an MTF function.

10. A computer program comprising instructions which, when the program is executed by a computer, cause the computer to carry out the steps of the method of claim 9.

11. A computer readable medium comprising instructions which, when the program is executed by a computer, cause the computer to carry out the steps of the method of claim 9.

12. A computer program comprising instructions which, when the program is executed by a computer, cause the computer to carry out the steps of the method of claim 8.

13. A computer readable medium comprising instructions which, when the program is executed by a computer, cause the computer to carry out the steps of the method of claim 8.

14. The method according to claim 1, wherein said point spread function $PSF_{xy}$ is converted into a sharpness parameter, such as an MTF function.

15. A computer program comprising instructions which, when the program is executed by a computer, cause the computer to carry out the steps of the method of claim 14.

16. A computer readable medium comprising instructions which, when the program is executed by a computer, cause the computer to carry out the steps of the method of claim 14.

17. A computer program comprising instructions which, when the program is executed by a computer, cause the computer to carry out the steps of the method of claim 1.

18. A computer readable medium comprising instructions which, when the program is executed by a computer, cause the computer to carry out the steps of the method of claim 1.

* * * * *